United States Patent
Yamada (10) Patent No.: US 9,986,120 B2
(45) Date of Patent: May 29, 2018

(54) ENVIRONMENT MANAGEMENT APPARATUS FOR INSIDE OF MACHINE, ELECTRONIC MACHINE, IMAGE FORMING APPARATUS, ENVIRONMENT MANAGEMENT METHOD FOR INSIDE OF MACHINE, AND NON-TRANSITORY COMPUTER READABLE MEDIUM

(71) Applicant: FUJI XEROX CO., LTD., Tokyo (JP)

(72) Inventor: Norikazu Yamada, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days. days.

(21) Appl. No.: 15/164,143

(22) Filed: May 25, 2016

(65) Prior Publication Data

US 2017/0171416 A1    Jun. 15, 2017

(30) Foreign Application Priority Data

Dec. 14, 2015  (JP) ................. 2015-243262

(51) Int. Cl.
  *G03G 21/20* (2006.01)
  *H04N 1/00* (2006.01)

(52) U.S. Cl.
  CPC ......... *H04N 1/00981* (2013.01); *G03G 21/20* (2013.01); *G03G 21/206* (2013.01); *G03G 2215/00084* (2013.01)

(58) Field of Classification Search
  CPC .. H04N 1/00981; G03G 21/20; G03G 21/206; G03G 2215/00084; G03G 15/5133
  See application file for complete search history.

(56) References Cited

U.S. PATENT DOCUMENTS

| | | |
|---|---|---|
| 6,519,552 B1 | 2/2003 | Sampath et al. |
| 2003/0216855 A1 | 11/2003 | Liang et al. |
| 2007/0009283 A1* | 1/2007 | Shirakata ............. G03G 21/206 399/92 |
| 2011/0292409 A1* | 12/2011 | Waarsing ........... G03G 15/5004 358/1.5 |

FOREIGN PATENT DOCUMENTS

| | | |
|---|---|---|
| JP | 2001-175328 A | 6/2001 |
| JP | 2003-328732 A | 11/2003 |
| JP | 4684496 B2 * | 5/2011 |

* cited by examiner

*Primary Examiner* — David M Gray
*Assistant Examiner* — Laura Roth
(74) *Attorney, Agent, or Firm* — Oliff PLC (57) ABSTRACT

An environment management apparatus for inside of a machine includes an estimator and a generator. The estimator estimates an environment state in the machine in a case of executing a process under a predetermined control condition, from process execution data for instructing execution of the process. The generator generates, for the environment state estimated by the estimator, a time-series scheme for environment control during the execution of the process from a calculation result obtained by calculating a control condition which maintains the environment state to be less than or equal to a predetermined target value.

18 Claims, 8 Drawing Sheets

| VOLUME OF AIR | OPENING STATE | PROBABILITY VALUE r | EXECUTION TIME t [MINUTES] IN CASE OF NECESSARY TIME T = 30 [MINUTES] | |
|---|---|---|---|---|
| A1 | B1 | 0.003206 | | 0.10 |
| | B2 | 0.007162 | | 0.21 |
| | B3 | 0.008832 | | 0.26 |
| A2 | B1 | 0.100534 | | 3.02 |
| | B2 | 0.224546 | | 6.73 |
| | B3 | 0.27692 | | 8.31 |
| A3 | B1 | 0.063293 | | 1.90 |
| | B2 | 0.141367 | | 4.24 |
| | B3 | 0.17434 | | 5.23 |

FIG. 7A

TIME DIVISION SCHEME

| ENVIRONMENT CONTROL CONDITION | EXECUTION TIME [MINUTES] | RISE IN TEMPERATURE [°C] | DEGREE OF POLLUTION |
|---|---|---|---|
| | 0.00 | 0.00 | 0.00 |
| A3B3 | 5.23 | 2.62 | 0.84 |
| A3B2 | 4.24 | 2.54 | 0.64 |
| A3B1 | 1.90 | 1.33 | 0.27 |
| A2B1 | 3.02 | 3.32 | 0.27 |
| A2B2 | 6.73 | 6.74 | 0.67 |
| A2B3 | 8.31 | 7.48 | 0.91 |
| A1B3 | 0.26 | 0.37 | 0.02 |
| A1B2 | 0.21 | 0.32 | 0.01 |
| A1B1 | 0.10 | 0.15 | 0.00 |

FIG. 7B

TIME DIVISION SCHEME

| ENVIRONMENT CONTROL CONDITION | EXECUTION TIME [MINUTES] | RISE IN TEMPERATURE [°C] | DEGREE OF POLLUTION |
|---|---|---|---|
| | 0.00 | 0.00 | 0.00 |
| A3B1 | 1.90 | 1.33 | 0.27 |
| A2B1 | 3.02 | 3.32 | 0.27 |
| A1B1 | 0.10 | 0.15 | 0.00 |
| A3B2 | 4.24 | 2.54 | 0.64 |
| A2B2 | 6.73 | 6.74 | 0.67 |
| A1B2 | 0.21 | 0.32 | 0.01 |
| A2B3 | 8.31 | 7.48 | 0.91 |
| A1B3 | 0.26 | 0.37 | 0.02 |
| A3B3 | 5.23 | 2.62 | 0.84 |

ENVIRONMENT MANAGEMENT APPARATUS FOR INSIDE OF MACHINE, ELECTRONIC MACHINE, IMAGE FORMING APPARATUS, ENVIRONMENT MANAGEMENT METHOD FOR INSIDE OF MACHINE, AND NON-TRANSITORY COMPUTER READABLE MEDIUM

CROSS-REFERENCE TO RELATED APPLICATIONS

This application is based on and claims priority under 35 USC 119 from Japanese Patent Application No. 2015-243262 filed Dec. 14, 2015.

BACKGROUND

Technical Field

The present invention relates to an environment management apparatus for inside of a machine, an electronic machine, an image forming apparatus, an environment management method for inside of a machine, and a non-transitory computer readable medium.

SUMMARY

According to an aspect of the invention, an environment management apparatus for inside of a machine includes an estimator and a generator. The estimator estimates an environment state in the machine in a case of executing a process under a predetermined control condition, from process execution data for instructing execution of the process. The generator generates, for the environment state estimated by the estimator, a time-series scheme for environment control during the execution of the process from a calculation result obtained by calculating a control condition which maintains the environment state to be less than or equal to a predetermined target value.

BRIEF DESCRIPTION OF THE DRAWINGS

Exemplary embodiments of the present invention will be described in detail based on the following figures, wherein.

DETAILED DESCRIPTION

Hereinafter, an in-apparatus environment management apparatus according to the present exemplary embodiment will be described with reference to the appended drawings. In the present exemplary embodiment, the in-apparatus environment management apparatus will be described as being applied to an image forming apparatus. Herein, the inside of a casing of the image forming apparatus may be referred to as "in-apparatus," "inside of a machine", or "inside of the image forming apparatus," and the environment inside of the casing of the image forming apparatus may be referred to as "in-apparatus environment," "environment in a machine," or "environment in the image forming apparatus."

Figure 1:
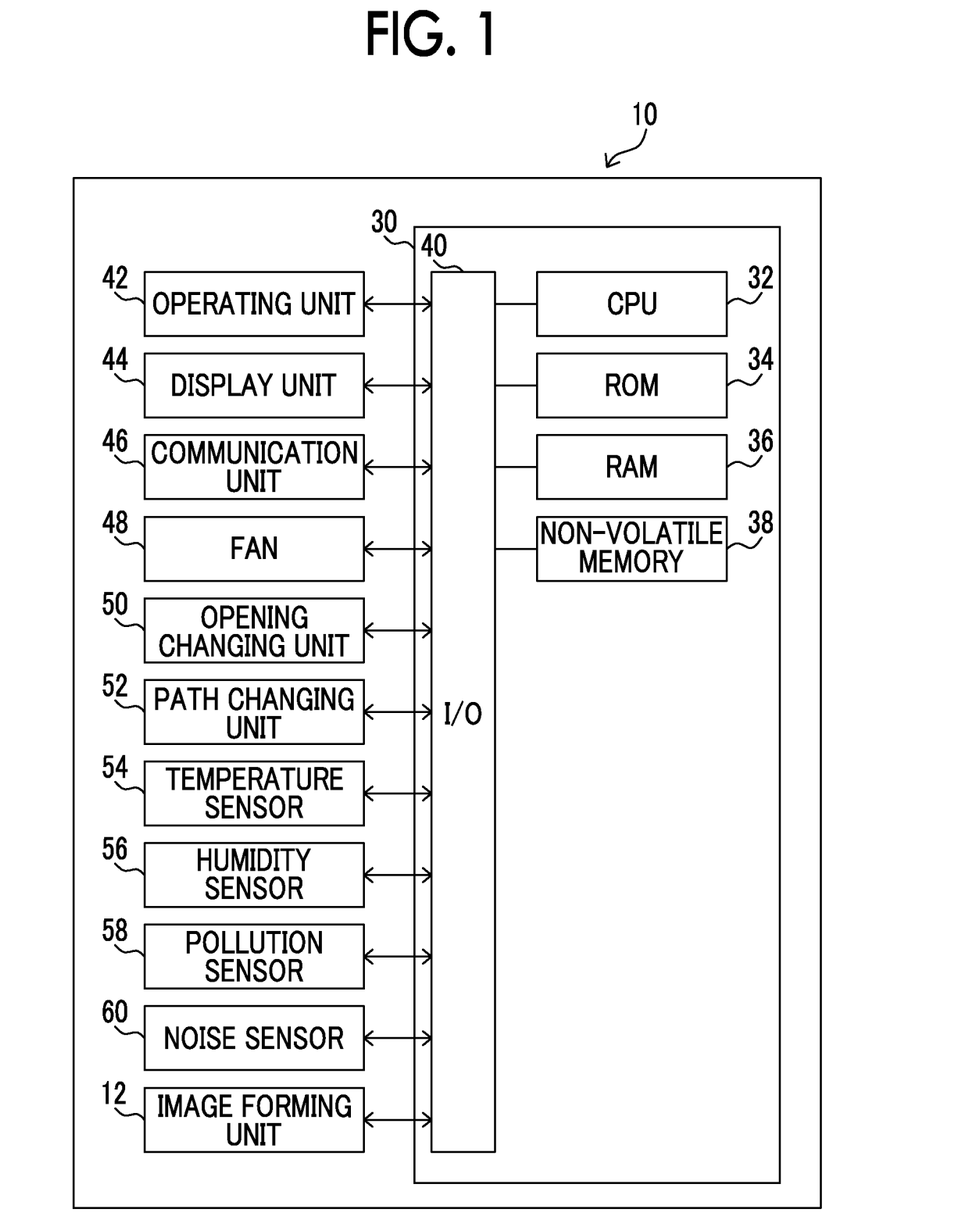
FIG. 1 is a block diagram illustrating an electrical configuration of an in-apparatus environment management apparatus according to an exemplary embodiment.

As illustrated in FIG. 1, an image forming apparatus 10 according to the present exemplary embodiment includes a controller 30 that controls the entirety of the apparatus. Various types of functions are realized by control of the image forming apparatus 10 using the controller 30. The controller 30 includes a central processing unit (CPU) 32 that executes various types of processes including an in-apparatus environment management process, described later, and a read-only memory (ROM) 34 that stores a program used in processing of the CPU 32 and various types of information. In addition, the controller 30 includes a random access memory (RAM) 36 that, as a work area for the CPU 32, temporarily stores various types of data and a non-volatile memory 38 that stores various types of information used in processing of the CPU 32. Furthermore, the controller 30 includes an I/O interface 40 that performs input and output of data with respect to an external apparatus connected to the image forming apparatus 10.

The I/O interface 40 is connected with an image forming unit 12 that includes developing rolls and forms an image on paper. If the image forming unit 12 obtains image forming data for instructing execution of image formation from the external apparatus or the like, the image forming unit 12 forms an image on paper based on the image forming data obtained. The image forming data is an example of process execution data for instructing execution of a process and includes image data of the formed image and image forming condition data that indicates image forming conditions. In the present exemplary embodiment, the image forming condition data includes the number of images formed, the proportion of a color image in the formed image, an image density, and the like as the image forming conditions. The image forming unit 12 outputs the obtained image forming data to an image forming data obtaining unit 14, described later, to notify the image forming data obtaining unit 14 that image formation will be executed.

An Image forming process that is executed by the image forming unit 12 if instructed to perform image formation will be described. The image forming unit 12 includes photosensitive bodies which are image carriers for respective colors, and these photosensitive bodies have surfaces thereof charged by application of a charging bias. The image forming unit 12 obtains image data for each color, forms electrostatic latent images on the photosensitive bodies by exposing the charged surfaces of the photosensitive bodies to exposure light that is modulated based on the image data for each color, and causes developers (toners) of each color to be held on the photosensitive bodies. The image forming unit 12 includes developing rolls for each color. Application of a developing bias to the developing rolls develops the electrostatic latent images on the photosensitive bodies with the toners of each color and forms toner images on the photosensitive bodies. The image forming unit 12 transfers the toner images of each color formed on the photosensitive bodies to an intermediate transfer belt and transfers and fixes the toner images, which are transferred onto the intermediate transfer belt, to paper, thereby forming an image on the paper.

The I/O interface 40 is connected with an operating unit 42 that is operated by a user, a display unit 44 that displays various types of information, and a communication unit 46 that communicates with the external apparatus. In addition, the I/O interface 40 is connected with a fan 48, an opening changing unit 50, and a path changing unit 52.

The fan 48, under control of the CPU 32, blows air in the apparatus and causes the air to circulate in the apparatus to decrease the in-apparatus temperature or blows air to the developing rolls to decrease the temperature of the developing rolls. At this point, the fan 48 changes the volume of blown air under control of the CPU 32. In the present exemplary embodiment, the fan 48 changes the volume of air to one of three-level discrete values of LOW, MID, and HIGH.

The opening changing unit 50 changes the opening state of opening portions that are provided so as to penetrate the casing, under control of the CPU 32. In the present exemplary embodiment, multiple opening portions are disposed in the casing of the image forming apparatus, and the opening changing unit 50 changes the opening state of each opening portion to one of an opened state and a closed state. However, the method for changing the opening state is not limited thereto. The opening area of each opening portion may be changed by covering at least a part of each opening portion with a lid portion, thereby placing each opening portion into a half-opened state. In the present exemplary embodiment, the opening changing unit 50 changes the opening state of the opening portions in such a manner that the total opening area of each opening portion is set to one of three-level discrete values of LOW, MID, and HIGH.

The path changing unit 52 changes a path along which the in-apparatus air flows, under control of the CPU 32. Examples of a method for changing the path include a method that changes the path of the air flow by changing the position, direction, and the like of a guide which guides the air. In the present exemplary embodiment, the path changing unit 52 changes the path of the air flow in such a manner that the path of the air flow is set to one of three paths of a path A, a path B, and a path C.

Hereinafter, the opening state of the opening portions will be simply referred to as "opening state", and the path of the air flow will be simply referred to as "path".

The I/O interface 40 is connected with a temperature sensor 54 that measures the in-apparatus temperature and a humidity sensor 56 that measures in-apparatus humidity. The temperature sensor 54 measures the in-apparatus temperature in response to an instruction from the CPU 32 and notifies the CPU 32 of the measured in-apparatus temperature. The humidity sensor 56 measures the in-apparatus humidity in response to an instruction from the CPU 32 and notifies the CPU 32 of the measured in-apparatus humidity.

The I/O interface 40 is connected with a pollution sensor 58 that measures the degree of in-apparatus pollution and a noise sensor 60 that measures the degree of in-apparatus noise.

In-apparatus pollution in the present exemplary embodiment is generally pollution that is generated by toners scattered in the casing or by toners settling on components disposed in the casing. The pollution sensor 58 is exemplified by a particle sensor, an electrical sensor, a measurer that measures the weight of settling toners, and the like. The pollution sensor 58 measures the degree of in-apparatus pollution in response to an instruction from the CPU 32 and notifies the CPU 32 of the measured degree of in-apparatus pollution.

Noise in the present exemplary embodiment is generally noise from the fan 48 and noise from transport of paper. Noise from the fan 48 is highly correlated with the volume of air from the fan 48, and noise from transport of paper is highly correlated with the opening state. The noise sensor 60 is exemplified by a microphone, a capacitor microphone, an acoustic pressure sensor, an acoustic particle velocity sensor, and the like. The noise sensor 60 measures the degree of noise in response to an instruction from the CPU 32 and notifies the CPU 32 of the measured degree of noise.

The image forming apparatus 10 to which the in-apparatus environment management apparatus according to the present exemplary embodiment is applied estimates the in-apparatus environment while executing image formation and controls the in-apparatus environment based on an estimation result, thereby stabilizing the in-apparatus environment.

That is, the image forming apparatus 10 estimates the state of the in-apparatus environment in a case of executing a process under predetermined in-apparatus control conditions (environment control conditions), based on the image forming data which is the process execution data for instructing execution of the process. The image forming apparatus 10 generates, the estimated environment state, a time-series scheme (hereinafter, referred to as "time division scheme") for environment control during execution of a process from a calculation result obtained by calculating environment control conditions that maintain the environment state to be less than or equal to predetermined target values. Then, the image forming apparatus 10 controls the in-apparatus environment control conditions based on the generated time division scheme.

The present exemplary embodiment will be described in a case of executing a process with setting of the environment control conditions that targets the volume of air from the fan 48, the opening state, and the path. However, the targets of the environment control conditions are not limited thereto. A process may be executed under environment control conditions that are related to two of the volume of air from the fan 48, the opening state, and the path. In addition, the present exemplary embodiment will be described in a case where environment control targets the environment state including the temperature of the developing rolls, the degree of in-apparatus pollution, and the degree of noise. However, the targets of environment state control are not limited thereto. Environment state control may target at least two of the temperature of the developing rolls, the degree of in-apparatus pollution, and the degree of noise. Alternatively, environment state control may target at least two of the temperature of the developing rolls, the degree of in-apparatus pollution, the degree of noise, the in-apparatus temperature, the in-apparatus humidity, and the degree of in-apparatus odor.

However, there is a so-called trade-off between the environment control conditions such that changing a part of the environment control conditions improves a part of the environment state but degrades the other part of the environment state. For example, if the volume of air from the fan 48 is increased, the temperature of the developing rolls is decreased, while the degree of pollution and the degree of noise are increased. If the opening area of the opening portions is decreased, the degree of pollution and the degree of noise are decreased, while the temperature of the developing rolls is increased.

In the present exemplary embodiment, therefore, the in-apparatus environment is stabilized by appropriately changing the environment control conditions in such a manner that the environment state satisfies the target values, as described above. Specifically, a probabilistic inference model is built from an interrelationship between each environment state by using a causal network, probability values of a discrete state of each environment state are estimated by using the probabilistic inference model built, and target values are set for each environment state. In addition, probability values of a discrete state of each environment control condition with respect to the target values of each environment state are inferred by using the same probabilistic inference model, and the environment control conditions that satisfy the target values of each environment state are estimated based on the inferred probability values. Then, in the present exemplary embodiment, the time division scheme for the environment control conditions during image formation is generated based on the estimated environment control conditions, and the in-apparatus environment is controlled based on the generated time division scheme.

The present exemplary embodiment is described in a case of using a Bayesian network as the probabilistic inference model using a causal network. In the Bayesian network, causal characteristics are represented as a network (weighted graph) using a directed graph (link using arrows), and performing probabilistic inference on the network allows the likelihood of occurrence or the possibility of a complex and uncertain event to be predicted. In the Bayesian network, information as to an interrelationship between each node is accumulated in advance, and calculating probability values of occurrence for each path based on the accumulated information as to the interrelationship between each node allows a probability value of occurrence of a causal relationship accompanying a complex path to be quantitatively represented.

Figure 2:
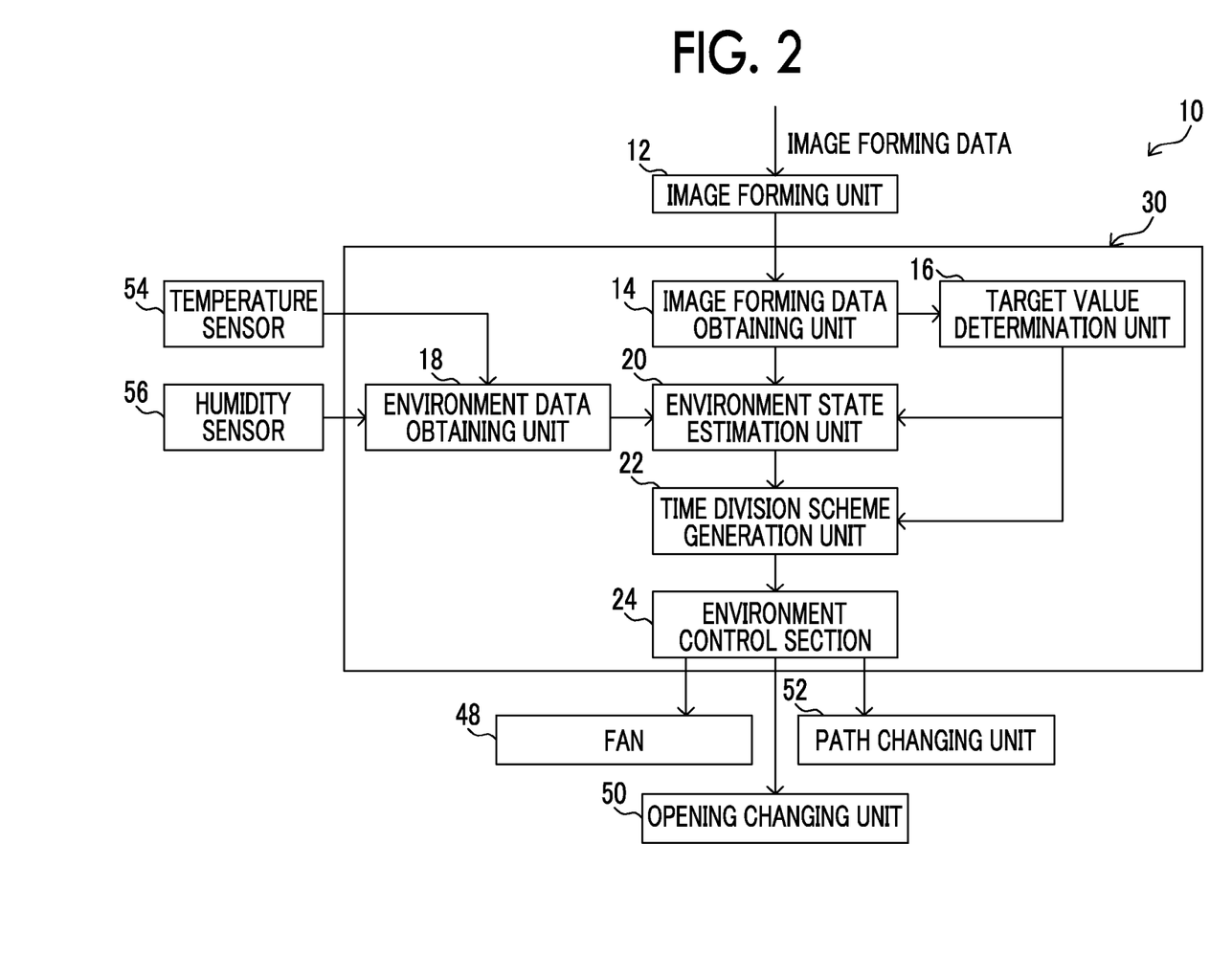
FIG. 2 is a block diagram illustrating a functional configuration of the in-apparatus environment management apparatus according to the exemplary embodiment.

Next, a functional configuration of the image forming apparatus 10 to which the in-apparatus environment management apparatus according to the present exemplary embodiment is applied will be described in detail.

As illustrated in FIG. 2, the image forming apparatus 10 according to the present exemplary embodiment includes the image forming data obtaining unit 14, a target value determination unit 16, an environment data obtaining unit 18, an environment state estimation unit 20, a time division scheme generation unit 22, and an environment control section 24. The image forming data obtaining unit 14, the target value determination unit 16, the environment data obtaining unit 18, the environment state estimation unit 20, the time division scheme generation unit 22, and the environment control section 24 are realized under control of the controller 30 (CPU 32).

The image forming data obtaining unit 14 obtains the image forming data from the image forming unit 12 when the image forming unit 12 executes image formation. The image forming data obtaining unit 14 outputs the obtained image forming data to the target value determination unit 16 and the environment state estimation unit 20.

The target value determination unit 16 obtains the image forming data from the image forming unit 12. The target value determination unit 16 determines target values for each of the temperature of the developing rolls, the degree of in-apparatus pollution, and the degree of noise that have to be maintained from the start of image formation based on the image forming data until the end thereof. The target value determination unit 16 outputs the determined target values to the environment state estimation unit 20 and the time division scheme generation unit 22.

The environment data obtaining unit 18 obtains the in-apparatus temperature from the temperature sensor 54 and obtains the in-apparatus humidity from the humidity sensor 56 as environment data. The environment data obtaining unit 18 outputs the obtained in-apparatus temperature and the in-apparatus humidity to the environment state estimation unit 20.

The environment state estimation unit 20 obtains the image forming data from the image forming data obtaining unit 14. The environment state estimation unit 20 estimates the environment state in the apparatus in a case of executing image formation based on the image forming data under predetermined environment control conditions. The present exemplary embodiment assumes that the predetermined environment control conditions include the volume of air from the fan 48 being set to a predetermined value, the opening state changed by the opening changing unit 50 being set to a predetermined opening state, and the path changed by the path changing unit 52 being set to a predetermined path. In addition, in the present exemplary embodiment, the temperature of the developing rolls, the degree of in-apparatus pollution, and the degree of noise in a case of executing image formation based on the image forming data under the predetermined environment control conditions are estimated as the environment state. The environment state estimation unit 20 outputs the estimated environment state to the time division scheme generation unit 22.

The time division scheme generation unit 22 obtains the environment state estimated by the environment state estimation unit 20 and the target values determined by the target value determination unit 16. The time division scheme generation unit 22 estimates the environment control conditions that are used to maintain the obtained environment state less than or equal to the target values. The time division scheme generation unit 22 generates the time division scheme that is used to change the environment control conditions during image formation, based on the environment control conditions used to maintain the environment state less than or equal to the target values. The time division scheme generation unit 22 outputs the generated time division scheme to the environment control section 24.

The environment control section 24 obtains the time division scheme from the time division scheme generation unit 22. The environment control section 24 controls changing of the volume of air from the fan 48, changing of the opening state by the opening changing unit 50, and changing of the path by the path changing unit 52 in a time-series manner in synchronization with image formation executed by the image forming unit 12 based on the obtained time division scheme.

Figure 3:
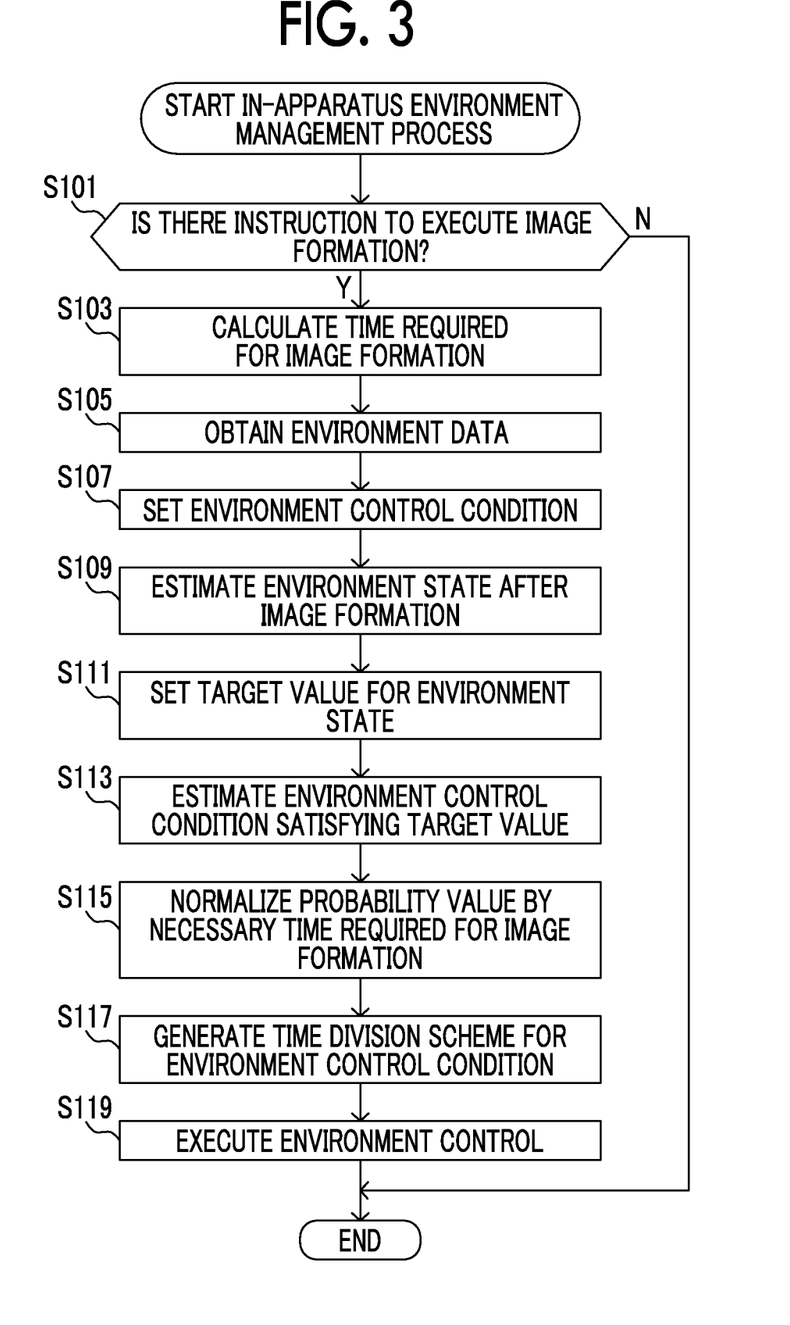
FIG. 3 is a flowchart illustrating a flow of a program for an in-apparatus environment management process according to the exemplary embodiment.

Next, a flow of the in-apparatus environment management process executed by the image forming apparatus 10 according to the present exemplary embodiment will be described with reference to the flowchart illustrated in FIG. 3.

In the present exemplary embodiment, a program for the in-apparatus environment management process is stored in advance in the non-volatile memory 38 but is not limited thereto. For example, the program for the in-apparatus environment management process may be received from the external apparatus through the communication unit 46 and then executed. Alternatively, the program for the in-apparatus environment management process may be recorded on a recording medium such as a CD-ROM and read through the I/O interface 40 such as a CD-ROM drive to execute the in-apparatus environment management process.

In the present exemplary embodiment, the program for the in-apparatus environment management process is executed each time a constant period of time (for example, 0.1 seconds) elapses while the image forming apparatus 10 operates. However, the timings at which the program for the in-apparatus environment management process is executed are not limited thereto. The program may be executed at a timing when an instruction to execute the program is input from the operating unit 42.

In Step S101, the image forming data obtaining unit 14 determines whether or not there is an instruction to perform image formation using the image forming unit 12. In the present exemplary embodiment, as described above, in a case where the image forming unit 12 executes image formation based on the image forming data, the image forming unit 12 notifies the image forming data obtaining unit 14 that image formation will be executed, by transmitting the image forming data to the image forming data obtaining unit 14. Accordingly, if the image forming data obtaining unit 14 receives the image forming data from the image forming unit 12, the image forming data obtaining unit 14 determines that there is an instruction to perform image formation. If it is determined that there is an instruction to perform image formation in Step S101 (Y in S101), the process transitions to Step S103. If it is determines that there is no instruction to perform image formation (N in S101), execution of the program for the in-apparatus environment management process is ended.

In Step S103, the image forming data obtaining unit 14 calculates from the obtained image forming data necessary time that is required for image formation based on the image forming data. The necessary time is calculated by using the image forming conditions which are the number of images formed, the ratio of color/black-and-white, the image density, and the like. For example, the necessary time is calculated by using a calculation formula that is obtained in advance by experiment, with each of the number of images formed, the ratio of color/black-and-white, and the image density as variables.

In Step S105, the environment data obtaining unit 18 obtains the environment data. In the present exemplary embodiment, the environment data obtaining unit 18 obtains the in-apparatus temperature from the temperature sensor 54 and obtains the in-apparatus humidity from the humidity sensor 56 as the environment data. In addition, in the present exemplary embodiment, the environment data obtaining unit 18 represents the obtained in-apparatus temperature as one of three-level discrete levels of LOW, MID, and HIGH. In addition, the environment data obtaining unit 18 represents the obtained in-apparatus humidity as one of three-level discrete levels of LOW, MID, and HIGH.

In Step S107, the environment state estimation unit 20 sets each of the environment control conditions to predetermined values. In the present exemplary embodiment, the environment state estimation unit 20 sets each of the volume of air from the fan 48, the opening state, and the path to predetermined values. The present exemplary embodiment will be described in a case where, for example, the volume of air from the fan 48 is set to, for example, MID, the opening state changed by the opening changing unit 50 is set to, for example, MID, and the path changed by the path changing unit 52 is set to the path B.

In Step S109, the environment state estimation unit 20 estimates the environment state in a case of performing image formation based on the image forming data. The environment state estimation unit 20, for example, uses a Bayesian network 80 illustrated in FIG. 4 to estimate the environment state in a case of performing image formation based on the image forming data.

Figure 4:
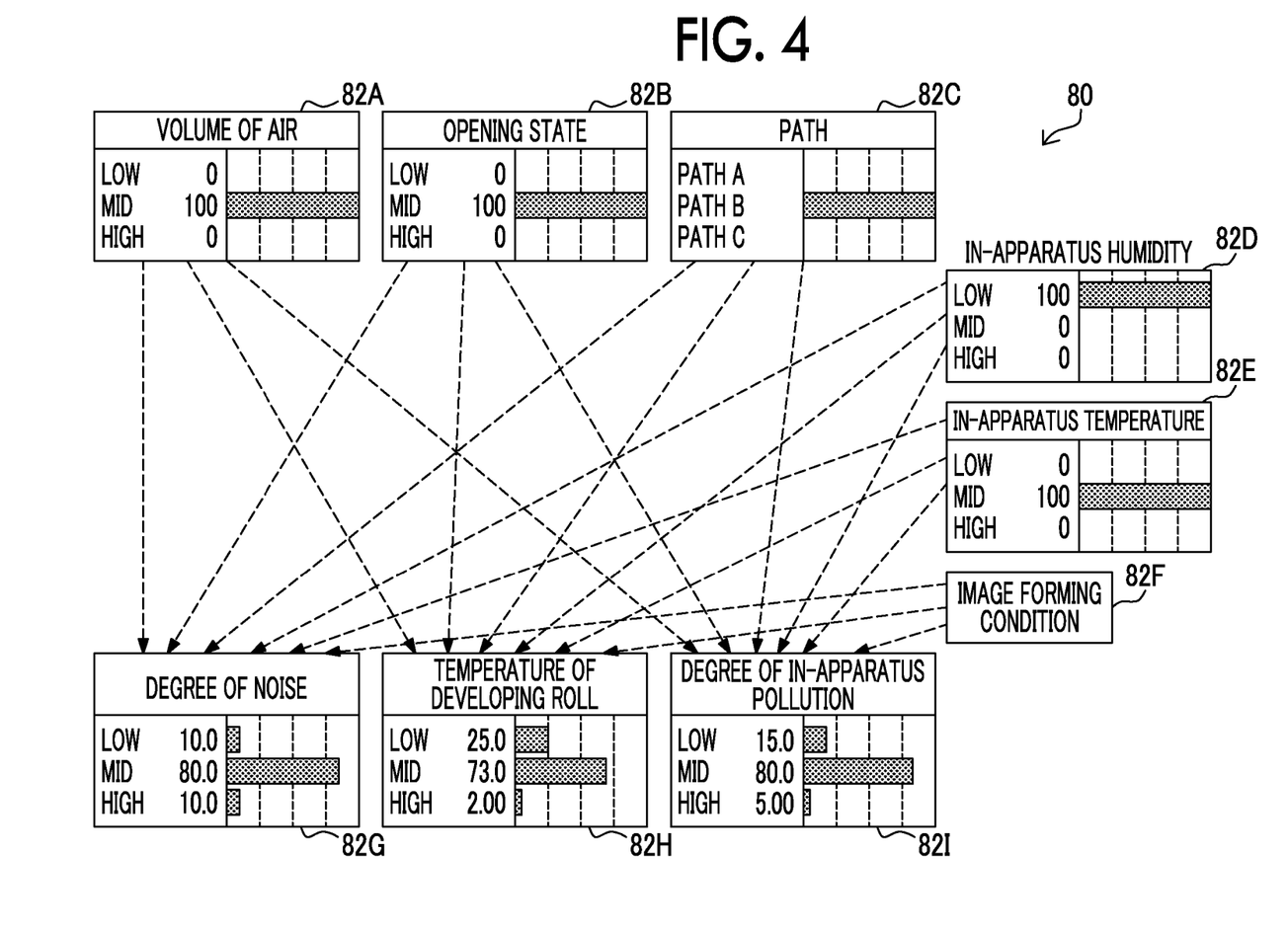
FIG. 4 is a schematic diagram illustrating an example of a setting state of each node of a Bayesian network at a time of estimating an environment state in the in-apparatus environment management apparatus according to the exemplary embodiment.

As illustrated in FIG. 4, the Bayesian network 80 is connected with nine nodes 82A to 82I as described below. That is, the Bayesian network 80 is connected with the node 82A in which the volume of air from the fan 48 is set, the node 82B in which the opening state is set, and the node 82C in which the path is set. In addition, the Bayesian network 80 is connected with the node 82D in which the in-apparatus humidity is set, the node 82E in which the in-apparatus temperature is set, and the node 82F in which image forming conditions are set. In addition, the Bayesian network 80 is connected with the node 82G in which the degree of noise is set, the node 82H in which the temperature of the developing rolls is set, and the node 82I in which the degree of pollution in the apparatus is set.

The environment state estimation unit 20 sets "MID" in the node 82A in which the volume of air from the fan 48 is set, "MID" in the node 82B in which the opening state is set, and "path B" in the node 82C in which the path is set, in the Bayesian network 80. In addition, in the Bayesian network 80, the environment state estimation unit 20 sets "LOW" in the node 82D in which the in-apparatus humidity is set and "MID" in the node 82E in which the in-apparatus temperature is set, based on the environment data obtained in Step S105. In addition, the environment state estimation unit 20 sets the image forming conditions included in the image forming data in the node 82F in which image forming conditions are set.

Meanwhile, in the present exemplary embodiment, the environment state estimation unit 20 does not set values in the node 82G in which the degree of noise is set, in the node 82H in which the temperature of the developing rolls is set, and in the node 82I in which the degree of in-apparatus pollution is set.

As described above, probability tables that represent probability values of occurrence for each path are created in the Bayesian network 80 based on information as to an interrelationship among the nodes 82A to 82I that is accumulated in advance. The environment state estimation unit 20 estimates probability values that will be used as the values of each of the nodes 82G to 82I, which are not set with values, based on the values set in each of the nodes 82A to 82F, which are set with values, using the Bayesian network 80.

As illustrated in FIG. 4, it is assumed that the volume of air from the fan 48 is set to "MID", the opening state is set to "MID", the path is set to "path B", the in-apparatus humidity is set to "LOW", and the in-apparatus temperature is set to "MID". In this case, for example, the probability values that the degree of noise is "LOW", "MID", and "HIGH" are respectively 10%, 80%, and 10%. The probability values that the degree of temperature of the developing rolls is "LOW", "MID", and "HIGH" are respectively 25%, 73%, and 2%. The probability values that the degree of in-apparatus pollution is "LOW", "MID", and "HIGH" are respectively 15%, 80%, and 5%.

In Step S111, the target value determination unit 16 sets target values for each environment state based on the temperature of the developing rolls, the degree of in-apparatus pollution, and the degree of noise estimated by using the Bayesian network 80. In the present exemplary embodiment, the estimated temperature of the developing rolls, the degree of in-apparatus pollution, and the degree of noise are displayed in the display unit 44 along with the target values of each environment state, and the user is allowed to input or correct the target values of each environment state. Then, the target value determination unit 16 sets the input or corrected target values as the target values of each environment state.

Figure 5:
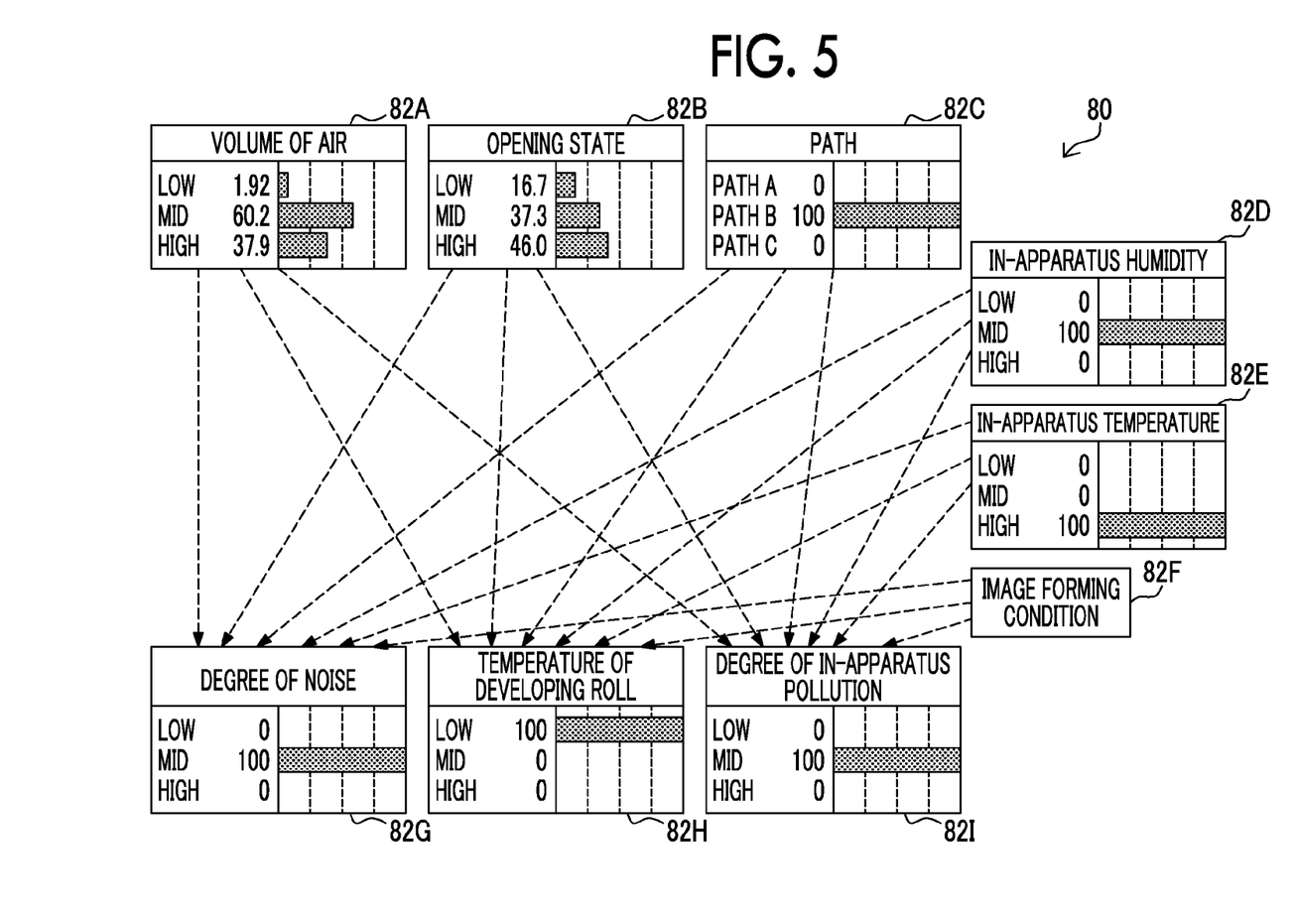
FIG. 5 is a schematic diagram illustrating an example of the setting state of each node of the Bayesian network at a time of estimating environment control conditions in the in-apparatus environment management apparatus according to the exemplary embodiment.

In Step S113, the time division scheme generation unit 22 estimates the environment control conditions that satisfy the set target values of the environment state. That is, in the Bayesian network 80, the time division scheme generation unit 22, for example, sets "MID" in the node 82G in which the degree of noise is set and "LOW" in the node 82H in which the temperature of the developing rolls is set. In addition, the time division scheme generation unit 22 sets "MID" in the node 82I in which the degree of in-apparatus pollution is set. The time division scheme generation unit 22 sets "MID" in the node 82D of the Bayesian network 80 in which the in-apparatus humidity is set and "HIGH" in the node 82E of the Bayesian network 80 in which the in-apparatus temperature is set, as the in-apparatus humidity and the in-apparatus temperature predicted in a case of executing image formation. In the present exemplary embodiment, the in-apparatus temperature and the in-apparatus humidity after image formation are set by predicting that each of the in-apparatus temperature and the in-apparatus humidity is increased by one level due to image formation. That is, the in-apparatus humidity that is "LOW" in the environment data obtained in Step S105 is set to "MID", and the in-apparatus temperature that is "MID" in the environment data obtained in Step S105 is set to "HIGH". The time division scheme generation unit 22 sets the image forming conditions included in the image forming data in the node 82F in which image forming conditions are set.

Meanwhile, in the present exemplary embodiment, the time division scheme generation unit 22 does not set values in the node 82A in which the volume of air from the fan 48 is set and in the node 82B in which the opening state is set. In addition, in the present exemplary embodiment, the path that is changed by the path changing unit 52 is assumed to be fixed to "path B". Accordingly, the environment state estimation unit 20 sets "path B" in the node 82C in which the path is set.

The time division scheme generation unit 22 estimates probability values that will be used as the values of each of the nodes 82A and 82B, which are not set with values, based on the values set in each of the nodes 82C to 82I, which are set with values, using the Bayesian network 80.

As illustrated in FIG. 5, it is assumed that the degree of noise is set to "MID", the temperature of the developing rolls is set to "LOW", the degree of in-apparatus pollution is set to "MID", the in-apparatus humidity is set to "MID", the in-apparatus temperature is set to "HIGH", and the path is set to "path B". In this case, for example, the probability values that the volume of air from the fan 48 is "LOW", "MID", and "HIGH" are respectively 1.92%, 60.2%, and 37.9%. The probability values that the opening state is "LOW", "MID", and "HIGH" are respectively 16.7%, 37.3%, and 46%.

Figure 6:
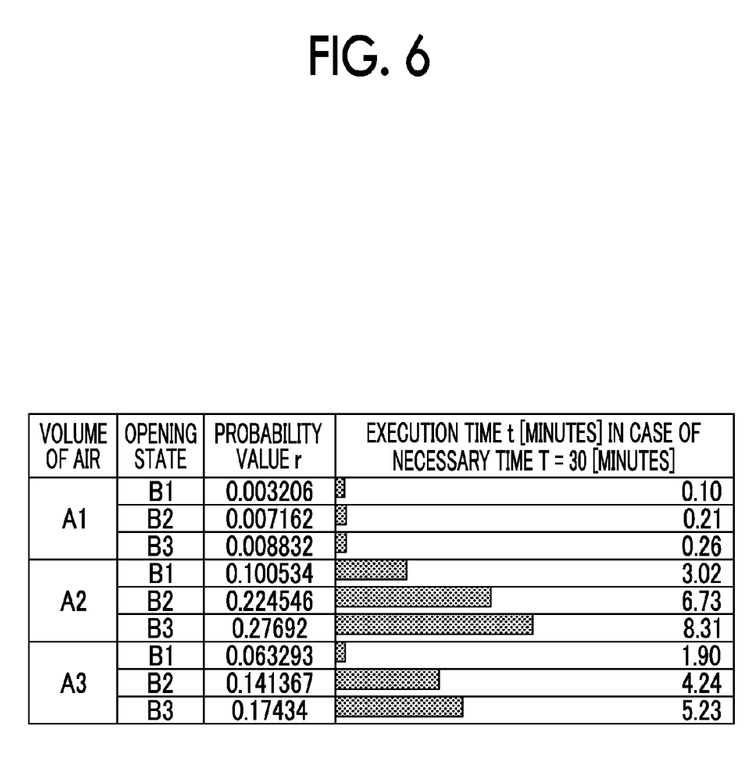
FIG. 6 is a table illustrating an example of an estimation result for a probability value for each combination of a fan air volume and an opening state in the in-apparatus environment management apparatus according to the exemplary embodiment.

FIG. 6 illustrates an example of an estimation result that is obtained by calculating probability values corresponding to each combination of the environment control conditions, the volume of air from the fan 48 and the opening state changed by the opening changing unit 50. In the example illustrated in FIG. 6, states where the volume of air from the fan 48 is LOW, MID, and HIGH are respectively denoted by A1, A2, and A3, and states where the opening state of the opening changing unit 50 is LOW, MID, and HIGH are respectively denoted by B1, B2, and B3.

In the example illustrated in FIG. 6, the probability value is 0.003206 in a case where, for example, the state of the volume of air is A1 and the state of changing by the opening changing unit 50 is B1, and the probability value is 0.007162 in a case where, for example, the state of the volume of air is A1 and the state of changing by the opening changing unit 50 is B2.

In Step S115, the time division scheme generation unit 22 normalizes the probability values corresponding to each combination of the environment control conditions by the necessary time required for image formation. Specifically, the time division scheme generation unit 22 calculates an integrated value R of a probability value r corresponding to each combination of the environment control conditions. In addition, the time division scheme generation unit 22 calculates necessary time T that is required for image formation based on the image forming data, from the image forming data obtained by the image forming data obtaining unit 14. Then, the time division scheme generation unit 22 calculates an execution time t for each combination of the environment control conditions using the following Equation (1).

$$t = \frac{r}{R} \times T \quad (1)$$

The example illustrated in FIG. 6 illustrates the execution time t for each combination of the environment control conditions in a case of setting the necessary time to 30 minutes.

In Step S117, the time division scheme generation unit 22 generates the time division scheme for the environment control conditions based on the execution time t for each combination of the environment control conditions. The generated time division scheme for the environment control conditions will be described in detail later.

In Step S119, the environment control section 24 starts to execute environment control in accordance with the generated time division scheme and ends the execution of the program for the in-apparatus environment management process.

Figure 7A:
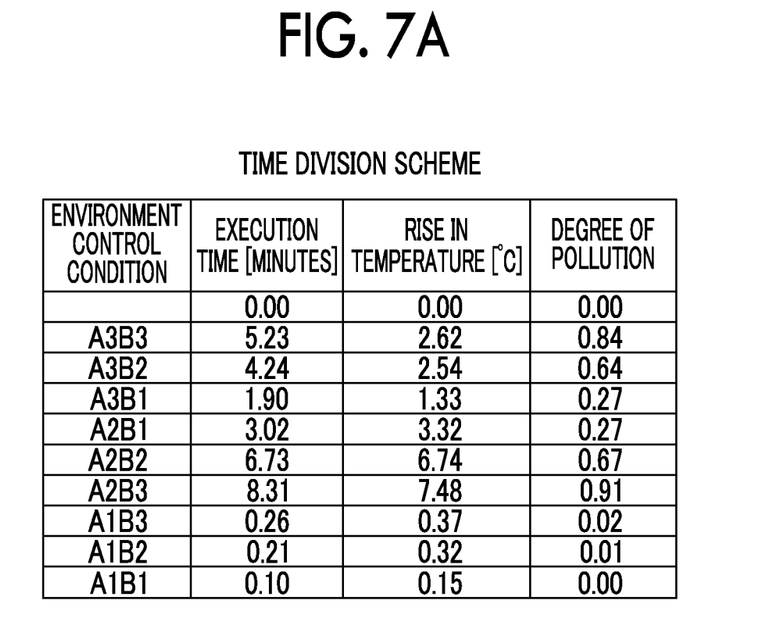
FIG. 7A is a table illustrating an example of a relationship among an execution time, a rise in temperature, and a degree of pollution for each combination of the fan air volume and the opening state in the in-apparatus environment management apparatus according to the exemplary embodiment.

As such, in the exemplary embodiment, each of the environment control conditions is changed based on the generated time division scheme during image formation. FIG. 7A illustrates the execution time, a rise in the temperature of the developing rolls, and the degree of in-apparatus pollution for each combination of the environment control conditions as an example of the time division scheme. A rise in the temperature of the developing rolls and the degree of in-apparatus pollution in FIG. 7A represent changes in the environment control conditions while each combination of the environment control conditions is applied and are measurement results obtained by performing the environment control based on the time division scheme.

The time division scheme illustrated in FIG. 7A indicates that when a control that sets the state of the volume of air from the fan 48 to A3 and the state of changing by the opening changing unit 50 to B3 is executed for 5.23 minutes, the temperature of the developing rolls is increased by 2.62° C. and the degree of pollution (relative value) is increased by 0.84. In addition, the time division scheme indicates that when a control that sets the state of the volume of air from the fan 48 to A3 and the state of changing by the opening changing unit 50 to B2 is executed for 4.24 minutes, the temperature of the developing rolls is increased by 2.54° C. and the relative value of the degree of pollution is increased by 0.64.

Figure 7B:
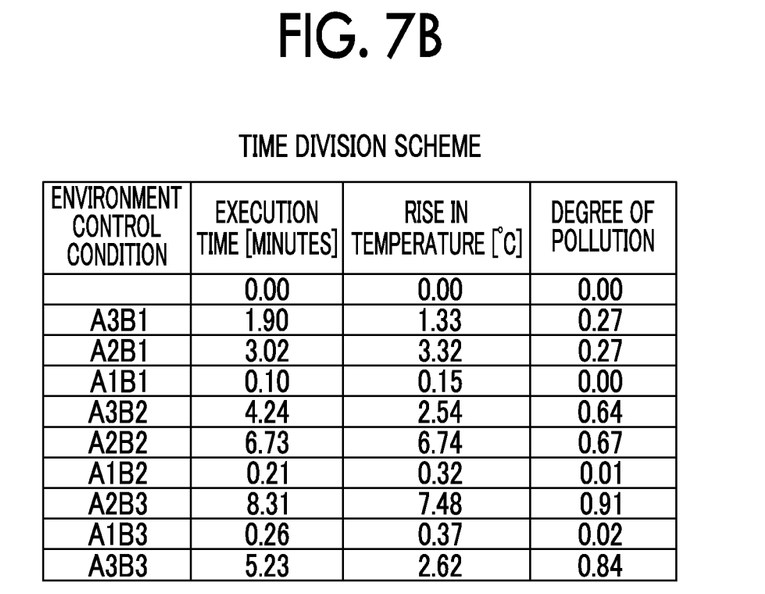
FIG. 7B is a table illustrating another example of a relationship among an execution time, a rise in temperature, and a degree of pollution for each combination of the fan air volume and the opening state in the in-apparatus environment management apparatus according to the exemplary embodiment.

While the order of controls in the time division scheme illustrated in FIG. 7A is such that the total of the number of times the volume of air from the fan 48 is changed and the number of times the opening state is changed is minimum, the order of controls is not limited thereto. For example, changing may be executed in an order in which the time required for changing of the environment control conditions is minimum. That is, in a case of changing the opening state, the changing includes a mechanical control such as moving the lid portion and requires larger time than changing of the volume of air from the fan 48. Considering this point, the order of controls may be such that, for example, the number of times the opening state is changed is minimized, as illustrated in FIG. 7B.

Figure 8:
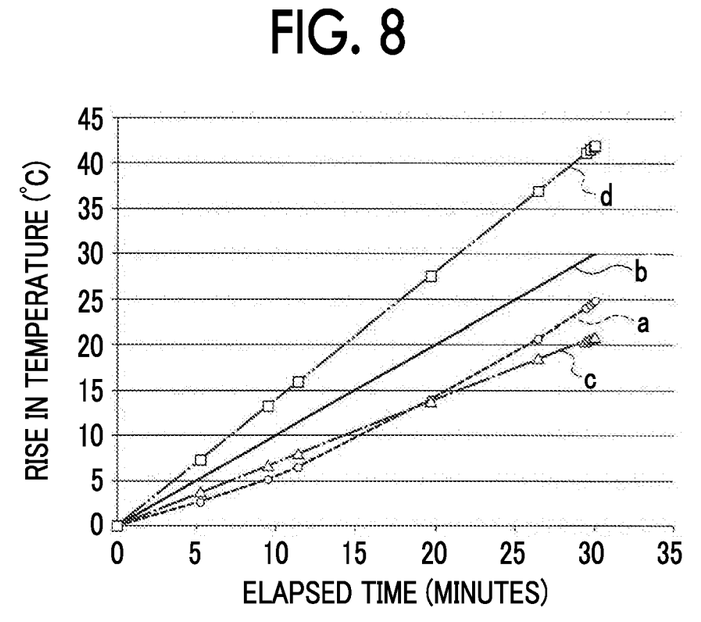
FIG. 8 is a graph illustrating an example of a relationship between an elapsed time and a rise in temperature in the in-apparatus environment management apparatus according to the exemplary embodiment.
Figure 9:
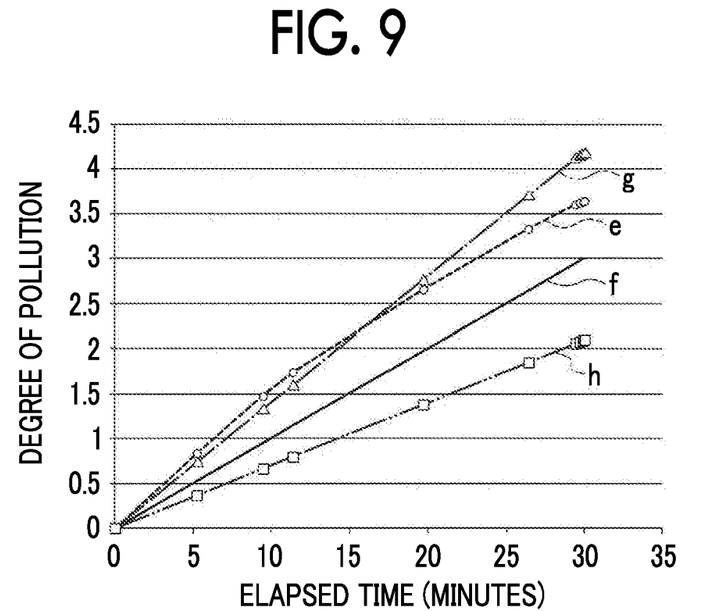
FIG. 9 is a graph illustrating an example of a relationship between an elapsed time and a degree of pollution in the in-apparatus environment management apparatus according to the exemplary embodiment.

FIG. 8 illustrates a measurement result for a rise in the temperature of the developing rolls in a case of changing the environment control conditions based on the time division scheme illustrated in FIG. 7A. FIG. 9 illustrates a measurement result for pollution in a case of changing the environment control conditions based on the example illustrated in FIG. 7A.

FIG. 8 illustrates a relationship a between an elapsed time and a rise in the temperature of the developing rolls in a case of performing the environment control based on the time division scheme. In addition, FIG. 8 illustrates a relationship b between the elapsed time and a rise in the temperature of the developing rolls in a case where a combination of the environment control conditions in which the state of the volume of air from the fan 48 is set to A2 and the state of changing by the opening changing unit 50 is set to B2 operates continuously for 30 minutes as a standard operating state of the environment control. In addition, FIG. 8 illustrates a relationship c between the elapsed time and a rise in the temperature of the developing rolls in a case of prioritizing suppression of a rise in the temperature of the developing rolls, that is, in a case where a combination of the environment control conditions in which the state of the volume of air from the fan 48 is set to A3 and the state of changing by the opening changing unit 50 is set to B1 operates continuously for 30 minutes. In addition, FIG. 8 illustrates a relationship d between the elapsed time and a rise in the temperature of the developing rolls in a case of prioritizing suppression of pollution, that is, in a case where a combination of the environment control conditions in which the state of the volume of air from the fan 48 is set to A1 and the state of changing by the opening changing unit 50 is set to B3 operates continuously for 30 minutes.

FIG. 9 illustrates a relationship e between the elapsed time and the degree of pollution in a case of performing the environment control based on the time division scheme. In addition, FIG. 9 illustrates a relationship f between the elapsed time and the degree of pollution in a case where a combination of the environment control conditions in which the environment control conditions are fixed to predetermined standard values as a standard operating state operates continuously for 30 minutes. In addition, FIG. 9 illustrates a relationship g between the elapsed time and the degree of pollution in a case where a combination of the environment control conditions that prioritizes suppression of a rise in the temperature of the developing rolls operates continuously for 30 minutes. Similarly, FIG. 9 illustrates a relationship h between the elapsed time and the degree of pollution in a case where a combination of the environment control conditions that prioritizes suppression of pollution operates continuously for 30 minutes.

As illustrated in FIG. 8 and FIG. 9, opposite results are obtained in such a manner that the in-apparatus pollution is increased in a case of prioritizing suppression of a rise in the temperature of the developing rolls (relationships c and g), while the temperature of the developing rolls is increased in a case of prioritizing suppression of pollution (relationships d and h). However, in the present exemplary embodiment (relationships a and e), it is understood that pollution is suppressed along with suppression of a rise in the temperature of the developing rolls during image formation. As such, performing controls based on the time division scheme generated in the present exemplary embodiment allows the in-apparatus environment control to be achieved according to the target values of the environment state in a case of controlling the environment control conditions by changing the environment control conditions to one of three-level discrete states.

When each of the environment control conditions of control targets is changed, the value of each of the environment control conditions of control targets may be changed from a large value (HIGH) to a small value (LOW) or from a small value (LOW) to a large value (HIGH). The changing may be executed in order from the largest execution time or from the minimum execution time. Alternatively, power consumptions in a case of performing the changing in each order may be calculated, and the changing may be executed in the order in which the power consumption is minimum.

As such, in the present exemplary embodiment, the environment state in a case of executing image formation under the environment control conditions including a predetermined volume of air, a predetermined opening state, and a predetermined path is estimated based on the image forming data for instructing execution of image formation. The time division scheme for the environment control during image formation is generated from calculation results in which the volume of air and the opening state that maintain the temperature of the developing rolls, the degree of noise, and the degree of pollution less than or equal to predetermined target values are calculated from the estimated environment state. The environment state is controlled based on the generated time division scheme.

Accordingly, stabilized image quality and stabilized operation are secured in the image forming apparatus 10 according to the present exemplary embodiment, and the in-apparatus environment is stabilized by using an inexpensive control system without use of a high-accuracy in-apparatus environment management system.

The present exemplary embodiment is described in a case of using the image forming data in calculation of the necessary time required for image formation but is not limited thereto. For example, as the time required for image formation is increased, the temperature of the developing rolls is increased, thereby producing a high possibility of malfunction. Considering this point, when the target values of the environment state are determined, the image forming conditions included in the image forming data may be used for setting such that the target value of the temperature of the developing rolls is decreased as the necessary time is increased. Alternatively, the image forming conditions included in the image forming data may be used for setting such that the target value of the temperature of the developing rolls is set to a minimum value if the necessary time is greater than or equal to a predetermined threshold.

The possibility that high image quality is required is increased as, for example, the proportion of a color image in the formed image is increased. Considering this point, when the target values of the environment state are determined, the image forming conditions included in the image forming data may be used for setting such that the target value of the degree of pollution is decreased as the proportion of a color image in the formed image is increased. Alternatively, the target value of the degree of pollution may be set to a minimum value if the proportion of a color image in the formed image is greater than or equal to a predetermined threshold.

The present exemplary embodiment is described in a case of setting the target values of the environment state in accordance with the estimation result for the environment state but is not limited thereto. The target values of the environment state may be set in advance to fixed values.

The present exemplary embodiment is described in a case where multiple opening portions are disposed in the casing of the image forming apparatus 10 but is not limited thereto. One opening portion may be disposed in the casing of the image forming apparatus 10. In this case, the opening area of the opening portion may be changed by covering at least a part of the opening portion with the lid portion.

The present exemplary embodiment is described in a case of using a Bayesian network in estimation of the environment state and estimation of the environment control conditions, but the estimation method is not limited thereto. A neural network, a model-based network, a rule-based network, and the like may be used.

The present exemplary embodiment is described in a case of applying the in-apparatus environment management apparatus to the image forming apparatus 10 that includes the developing rolls. However, the target for application of the in-apparatus environment management apparatus according to the present exemplary embodiment is not limited to the image forming apparatus 10. The in-apparatus environment management apparatus is applied to electronic apparatuses such as a personal computer, a mobile terminal, and a smartphone. The in-apparatus environment management apparatus according to the present exemplary embodiment is also applied to electrical appliances such as a refrigerator, a washing machine, a television, a video recording and reproducing machine, and a dryer.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An environment management apparatus for inside of a machine, the apparatus comprising:
    an estimator that estimates an environment state in the machine in a case of executing a process under a predetermined control condition, from process execution data for instructing execution of the process; and
    a generator that generates, for the environment state estimated by the estimator, a time-series scheme for environment control during the execution of the process from a calculation result obtained by calculating a control condition which maintains the environment state to be less than or equal to a predetermined target value,
    wherein the generator is configured to set the control condition which maintains the environment state to meet target values for a volume of air from a fan, a target value for an opening state of at least one opening portion, and a defined path of airflow,
    wherein the environment control comprises changing the volume of air from the fan, changing the opening state of the at least one opening portion by an opening changing unit, and changing the defined path of airflow by a path changing unit in a time-series manner in synchronization with image formation executed by an image forming unit based on the time-series scheme, and
    wherein the generator generates the time-series scheme in such a manner that if mechanical changing is included in changing the control condition which maintains the environment state, a number of times the mechanical changing is executed is minimum when environment control is executed based on the time-series scheme.

2. The environment management apparatus according to claim 1,
    wherein the estimator estimates the environment state using a Bayesian network, and
    the generator generates, for the environment state estimated by the estimator, the time-series scheme for the environment control during the process from the calculation result obtained by calculating the control condition that maintains the environment state to be less than or equal to the predetermined target value using the Bayesian network.

3. The environment management apparatus according to claim 1,
    wherein the generator generates the time-series scheme in such a manner that a time required for changing of the control condition which maintains the environment state is minimum when environment control is executed based on the scheme.

4. The environment management apparatus according to claim 1,
wherein the generator generates the time-series scheme in such a manner that power required for changing of the control condition which maintains the environment state is minimum when environment control is executed based on the time-series scheme.

5. An electronic machine comprising:
the environment management apparatus according to claim 1; and
a controller that controls an environment in the electronic machine based on the time-series scheme generated by the generator.

6. The electronic machine according to claim 5, further comprising:
a fan that blows air in the electronic machine,
wherein the controller controls the fan based on the time-series scheme to change a volume of air.

7. The electronic machine according to claim 5, further comprising:
at least one opening portion that is provided so as to penetrate a casing of the electronic machine; and
the opening changing unit that changes the opening state of the at least one opening portion, wherein
the controller controls the opening changing unit based on the time-series scheme to change an opening area of the at least one opening portion.

8. The electronic machine according to claim 5, further comprising:
a plurality of paths of airflow; and
a path changing unit that changes the path along which air flows, wherein
the controller controls the path changing unit based on the time-series scheme to change the path along which air flows to one of the plurality of paths of airflow.

9. An image forming apparatus comprising:
an estimator that estimates at least two of a temperature of a developing roll, a degree of noise, and a degree of pollution which correspond to an environment state in the image forming apparatus in a case of executing image formation under at least two of control conditions including a predetermined volume of air, a predetermined opening state, and a predetermined path along which air flows, from image forming data for instructing execution of the image formation;
a generator that generates, for the environment state estimated by the estimator, a time-series scheme for environment control during the execution of the image formation from a calculation result obtained by calculating at least two of a volume of air, an opening state, and a path which maintain at least two of the temperature of the developing roll, the degree of noise, and the degree of pollution to be less than or equal to predetermined target values; and
a controller that controls an environment state in the image forming apparatus based on the time-series scheme generated by the generator.

10. The image forming apparatus according to claim 9, wherein the generator generates, for the environment state estimated by the estimator, the scheme by normalizing, by necessary time required for image formation, probability values calculated using a Bayesian network that the at least two of the volume of air, the opening state, and the path which maintain the at least two of the temperature of the developing roll, the degree of noise, and the degree of pollution to be less than or equal to the predetermined target values.

11. The image forming apparatus according to claim 10, wherein the estimator obtains at least one of a temperature in the image forming apparatus and a humidity in the image forming apparatus and estimates the environment state by using the at least one of the temperature and the humidity.

12. The image forming apparatus according to claim 10, wherein the generator generates the scheme in such a manner that a number of times the opening state is changed is minimum.

13. The image forming apparatus according to claim 9, wherein the estimator obtains at least one of a temperature in the image forming apparatus and a humidity in the image forming apparatus and estimates the environment state using the at least one of the temperature and the humidity.

14. The image forming apparatus according to claim 13, wherein the generator generates the scheme in such a manner that a number of times the opening state is changed is minimum.

15. The image forming apparatus according to claim 9, wherein the generator generates the scheme in such a manner that a number of times the opening state is changed is minimum.

16. The image forming apparatus according to claim 9, wherein the predetermined target values are set based on an image forming condition included in the image forming data.

17. The image forming apparatus according to claim 16, wherein the predetermined target values are set based on necessary time required for image formation that is calculated based on the image forming condition included in the image forming data.

18. An environment management method for inside of a machine, the method comprising:
estimating an environment state in the machine in a case of executing a process under a predetermined control condition, from process execution data for instructing execution of the process; and
generating, for the estimated environment state, a time-series scheme for environment control during the execution of the process from a calculation result obtained by calculating a control condition which maintains the environment state to be less than or equal to a predetermined target value, and
setting the control condition which maintains the environment state to meet target values for a volume of air from a fan, a target value for an opening state of at least one opening portion, and a defined path of airflow,
wherein the control condition which maintains the environment state comprises changing the volume of air from the fan, changing the opening state of the at least one opening portion by an opening changing unit, and changing the defined path of airflow by a path changing unit in a time-series manner in synchronization with image formation executed by an image forming unit based on the time-series scheme, and
wherein the time-series scheme is generated in such a manner that if mechanical changing is included in the changing process of the control condition which maintains the environment state, a number of times the mechanical changing is executed is minimum when environment control is executed based on the time-series scheme.

* * * * *